(12) United States Patent
Hammond et al.

(10) Patent No.: US 9,226,549 B2
(45) Date of Patent: Jan. 5, 2016

(54) TAG HANGER

(71) Applicant: Y-Tex Corporation, Cody, WY (US)

(72) Inventors: Walter Lee Hammond, Powell, WY (US); Ronald Kevin Knapp, Cody, WY (US)

(73) Assignee: Y-TEX CORPORATION, Cody, WY (US)

( * ) Notice: Subject to any disclaimer, the term of this patent is extended or adjusted under 35 U.S.C. 154(b) by 112 days.

(21) Appl. No.: 13/707,154

(22) Filed: Dec. 6, 2012

(65) Prior Publication Data

US 2014/0157554 A1 Jun. 12, 2014

(51) Int. Cl.
A44B 13/00 (2006.01)
A44C 5/20 (2006.01)
A01K 27/00 (2006.01)

(52) U.S. Cl.
CPC ........... *A44B 13/0029* (2013.01); *A01K 27/008* (2013.01); *A44C 5/2033* (2013.01); *Y10T 24/3484* (2015.01)

(58) Field of Classification Search
CPC . A01K 11/001; A01K 11/00; A44B 13/0029; A01K 27/008; A44C 5/2033; Y10T 24/3484
USPC ................................. 24/3.12, 601.5
See application file for complete search history.

(56) References Cited

U.S. PATENT DOCUMENTS

| 261,749 | A | * | 7/1882 | Morris ......................... 294/82.27 |
| 267,089 | A | * | 11/1882 | Leirmann ................... 294/82.27 |
| 3,965,602 | A | * | 6/1976 | Whitney ......................... 40/301 |
| 4,581,834 | A | * | 4/1986 | Zatkos et al. ................. 40/301 |
| 4,781,037 | A | * | 11/1988 | Willibald ......................... 63/13 |
| 4,920,671 | A | * | 5/1990 | Zatkos ............................. 40/301 |
| 4,943,294 | A | * | 7/1990 | Knapp ........................... 606/117 |
| 5,535,491 | A | * | 7/1996 | Allport ........................... 24/429 |
| 6,098,253 | A | * | 8/2000 | Nishida et al. ................. 24/429 |
| 7,877,844 | B2 | * | 2/2011 | Nichols et al. ................. 24/3.11 |
| 8,151,419 | B2 | * | 4/2012 | Rolain et al. ................. 24/601.5 |
| 2002/0066418 | A1 | | 6/2002 | Fearing et al. |

(Continued)

FOREIGN PATENT DOCUMENTS

JP 2000-014268 A 1/2000
WO 82-01639 A1 5/1982

(Continued)

OTHER PUBLICATIONS

International Search Report and Written Opinion regarding International Application No. PCT/US2013/073270, mailed Mar. 17, 2014.

*Primary Examiner* — Robert J Sandy
*Assistant Examiner* — Louis Mercado
(74) *Attorney, Agent, or Firm* — Harness, Dickey & Pierce, P.L.C.

(57) ABSTRACT

A tag hanger is provided and may include a first portion having a first attachment feature and a first locking element movable from an unlocked state to a locked state. The tag hanger may additionally include a second portion having a second attachment feature rotatably attached to the first attachment feature and a second locking element movable from an unlocked state to a locked state. The second portion may cooperate with the first portion to define an aperture that attaches the first portion and the second portion to an external structure when the first and second locking elements are in the locked state.

17 Claims, 5 Drawing Sheets

(56) References Cited

U.S. PATENT DOCUMENTS

2009/0320770 A1* 12/2009 Rolain et al. ............... 119/858
2012/0030977 A1* 2/2012 Knapp ........................ 40/301

FOREIGN PATENT DOCUMENTS

| WO | 0040084 A2 | 7/2000 |
| WO | 2010-016779 A1 | 2/2010 |

* cited by examiner

TAG HANGER

FIELD

The present disclosure relates to a tag hanger and more particularly to a two-piece tag hanger.

BACKGROUND

This section provides background information related to the present disclosure which is not necessarily prior art.

Identification tags are often used in conjunction with animals to identify the animal and/or to identify the animal's owner by name and address. Such identification tags are particularly useful in the event that the animal becomes lost to allow the animal to be identified and returned to the owner. Accordingly, identification tags are typically securely attached to a collar of an animal to ensure that the identification tag remains with the animal at all times.

Tags containing pest repellant are also often used in conjunction with animals in an effort to protect the animal from irritating and/or harmful bugs. For example, a tag may be impregnated with a chemical that repels fleas and/or ticks to prevent such bugs from irritating or harming the animal. Such tags may be fastened to a collar of the animal in a similar fashion as an identification tag such that the impregnated tag is disposed proximate to a neck of the animal.

Conventional collars typically include a metal loop or ring that receives a tag hanger that properly positions an identification tag and/or an impregnated tag relative to a neck of an animal. Such tag hangers may include a first portion supporting one or more tags and a second portion that attaches to the ring of the collar. In so doing, the tag hanger acts as an intermediary between a tag and a ring of a collar to attach the tag to the collar.

Conventional tag hangers typically include a main body having a first opening that is attached to a tag and a second opening that is attached to a ring of a collar. The respective openings typically include a latch mechanism that is movable from an open state to a closed state. When the latch mechanism is in the open state, the tag and the ring may be inserted into the respective openings of the tag hanger. Once the tag and the ring are inserted into the tag hanger, the latch mechanism may be moved into the closed state to prevent removal of the tag and the ring from the tag hanger. In this position, the tag is attached to the collar via the tag hanger and the ring to allow the tag to properly identify the animal and/or to provide the animal with a pest repellant.

Conventional tag hangers adequately support a tag relative to an animal. However, conventional tag hangers are typically cumbersome and heavy. For example, conventional latch mechanisms associated with tag hangers are typically made of metal to provide the tag hanger with at least one latch mechanism that may be repeatedly moved between a closed state and an open state without failing. As a result, conventional latch mechanisms and, thus, conventional tag hangers are somewhat cumbersome and heavy. Further, such latch mechanisms are typically biased into the closed state to prevent inadvertent removal of the tag from the tag hanger and to prevent inadvertent removal of the tag hanger from the ring of the collar. Biasing the latch mechanism into the closed state requires a biasing element such as a spring, which adds to the overall cost, complexity, and weight of the tag hanger. In short, while conventional tag hangers adequately support a tag relative to a collar of an animal, such tag hangers are typically heavy, costly, and unnecessarily complex.

SUMMARY

This section provides a general summary of the disclosure, and is not a comprehensive disclosure of its full scope or all of its features.

A tag hanger is provided and may include a first portion having a first attachment feature and a first locking element movable from an unlocked state to a locked state. The tag hanger may additionally include a second portion having a second attachment feature rotatably attached to the first attachment feature and a second locking element movable from an unlocked state to a locked state. The second portion may cooperate with the first portion to define an aperture that attaches the first portion and the second portion to an external structure when the first and second locking elements are in the locked state.

In another configuration, a tag hanger is provided and may include a first portion including a first hook portion having a first opening and a first locking element movable from an unlocked state to a locked state. The tag hanger may additionally include a second portion rotatably attached to the first portion and including a second hook portion having a second opening and a second locking element movable from an unlocked state to a locked state. A mounting aperture may be formed by the first hook portion and the second hook portion, whereby the mounting aperture is formed by the first portion closing the second opening and the second portion closing the first opening when the first and second locking elements are in the locked state.

In another configuration, a tag hanger is provided and may include a first portion having a first attachment feature with an axis of rotation, a first surface, and a first hook portion extending from the first attachment feature. The tag hanger may additionally include a second portion having a second attachment feature rotatably attached to the first attachment feature, a second surface, and a second hook portion extending from the second attachment feature. The first hook portion may engage the second hook portion upon relative rotation between the first portion and the second portion about the axis of rotation to define a distance between the first surface and the second surface along the axis of rotation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
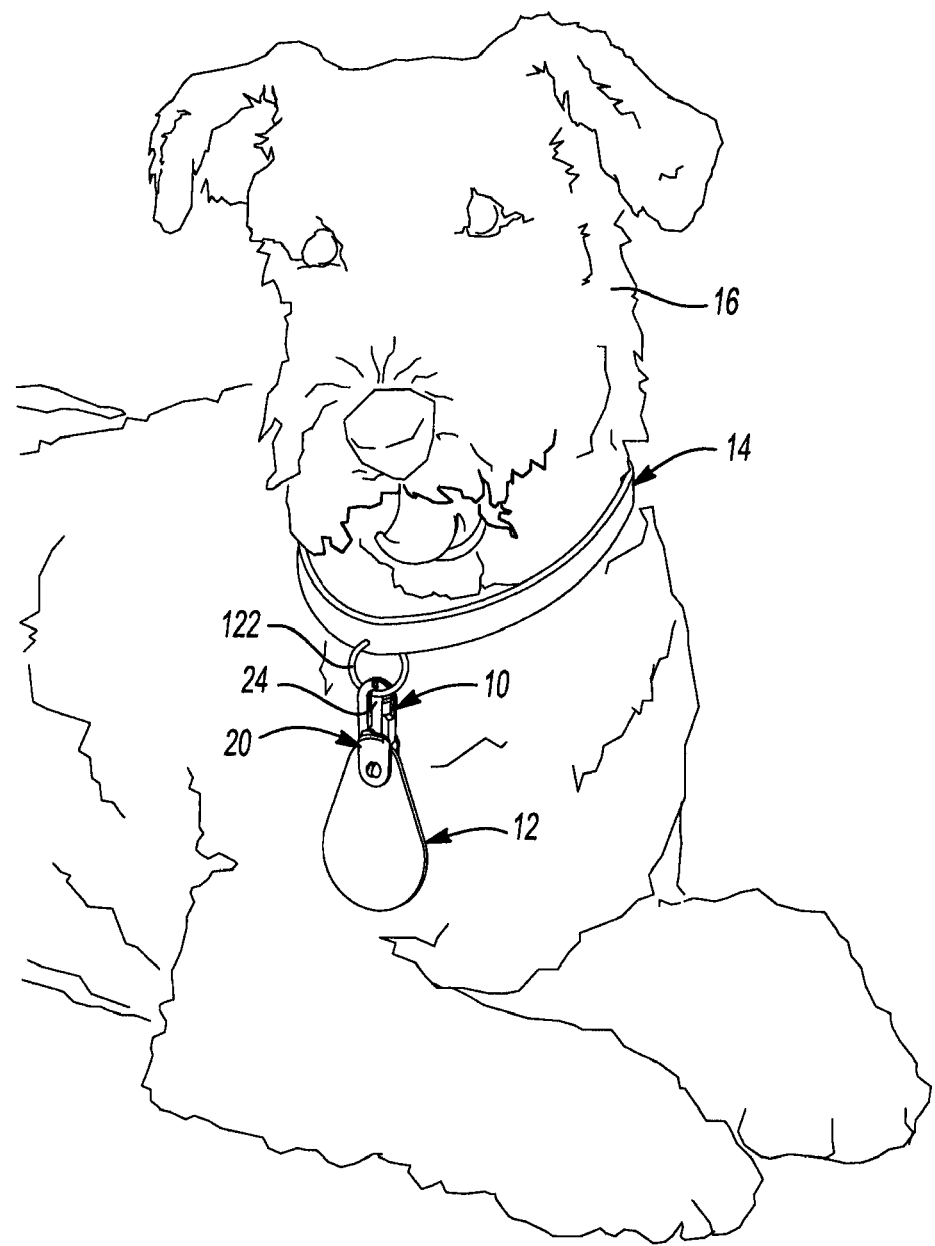
FIG. 1 is a perspective view of a tag hanger in accordance with the principles of the present disclosure shown in conjunction with a collar, a tag, and an animal.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a tag hanger 10 is provided for use in supporting a tag 12 relative to a collar 14 of an animal 16. The tag hanger 10 may include a first portion 18, a second portion 20, and a locking mechanism 22 that selectively attaches the first portion 18 to the second portion 20 to define an attachment aperture 24 that may support the tag hanger 10 and the tag 12 relative to the collar 14 (FIG. 1).

Figures 6, 7, 8:
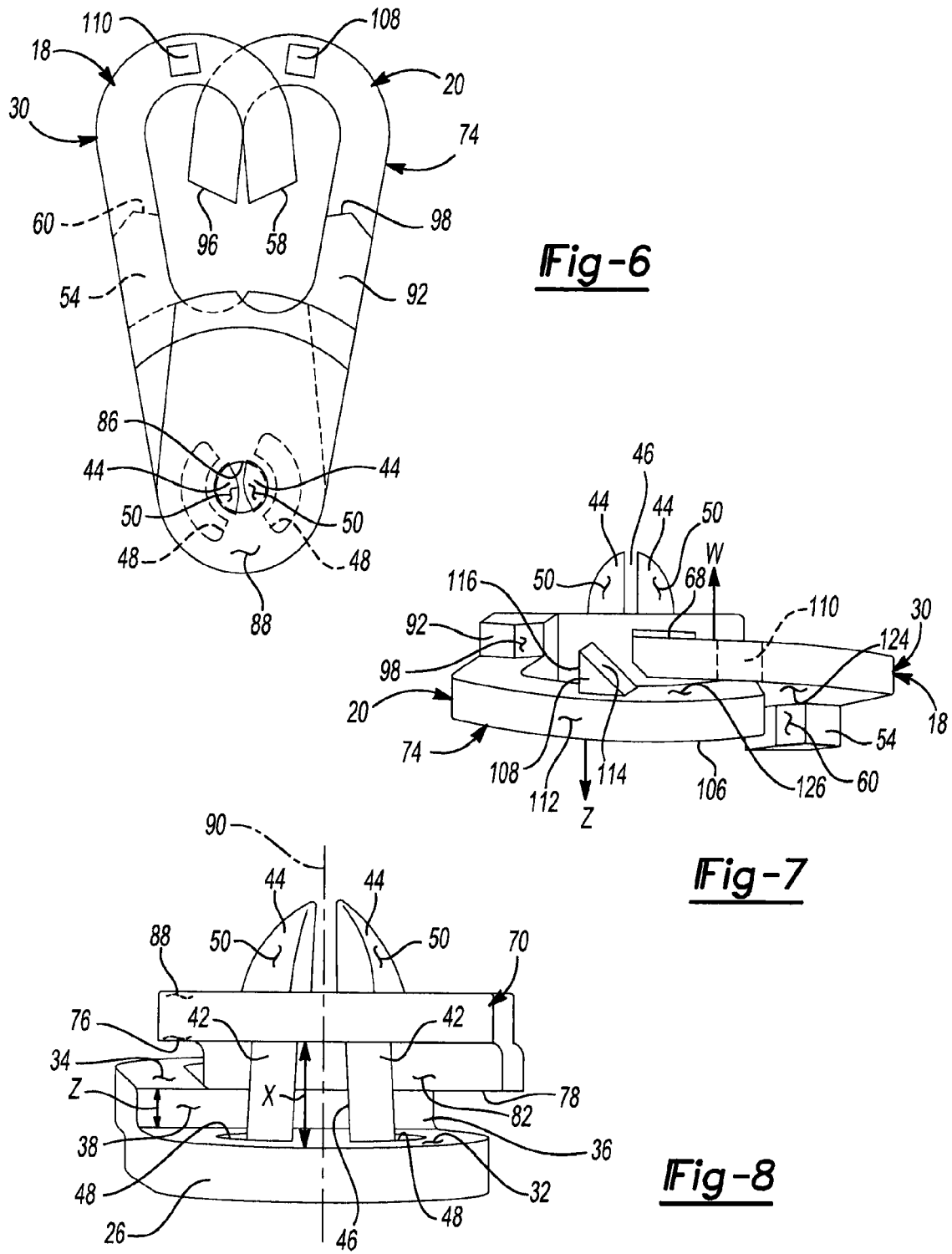
FIG. 6 is a front view of the tag hanger of FIG. 1 moving from an unlocked state to a locked state.
FIG. 7 is a top view of the tag hanger of FIG. 1 moving from an unlocked state to a locked state.
FIG. 8 is a bottom view of the tag hanger of FIG. 1 in a locked state.
Figure 9:
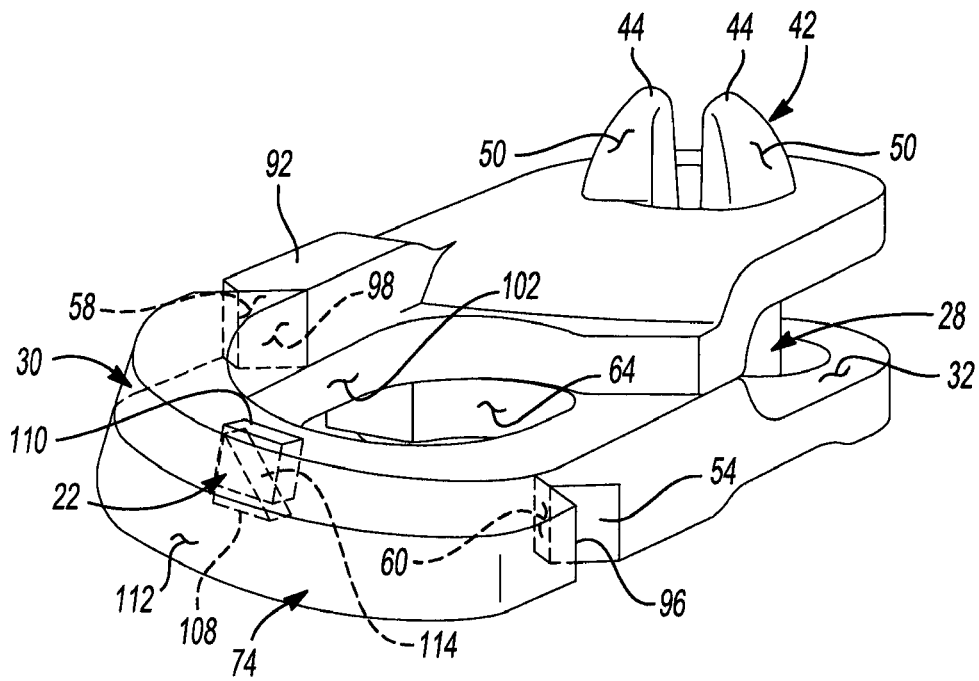
FIG. 9 is a perspective view of the tag hanger of FIG. 1 in a locked state.

The first portion 18 may include a main body 26, an attachment feature 28, and a hook portion 30 extending from the main body 26. The main body 26 may include a first surface 32 proximate to the attachment feature 28 and a second surface 34. The second surface 34 may be offset from the first surface 32 by a distance (Z), as shown in FIG. 8. The first surface 32 may be joined to the second surface 34 by a bridge portion 36 having a substantially arcuate surface 38. Providing the bridge portion 36 with a substantially arcuate surface 38 may likewise provide the first portion 18 with a substantially arcuate outer surface 40 in the area of the bridge portion 36.

The attachment feature 28 may extend from the main body 26 proximate to the first surface 32. The attachment feature 28 may include a post 42 having a retention feature 44 disposed at a distal end of the post 42. In one configuration, the post 42 may include a channel 46 that extends substantially along the length of the post 42 such that the post 42 is bifurcated into two segments. Providing the post 42 with a channel 46 running substantially along the length of the post 42 allows the post 42 to be compressed such that the respective segments are permitted to be drawn into the channel 46 and toward one another.

The post 42 may be formed from a resilient material such as, for example, plastic, and may be moved between an expanded state and a compressed state. Further, the post 42 may be formed such that the segments of the post 42 are biased into the expanded state and in a direction away from one another. Therefore, when a force applied to the segments of the post 42 is released, the resilient nature of the material forming the post 42 automatically causes the segments of the post 42 to move away from one another. As will be described in greater detail below, biasing the segments of the post 42 in a direction away from one another and into the expanded state allows the post 42 to engage the second portion 20 to attach the first portion 18 and second portion 20 to one another.

The post 42 may extend from the first surface 32 of the main body 26 proximate to one or more openings 48. The openings 48 may be formed through the main body 26 at the first surface 32 and proximate to a base of the post 42 to allow the post 42 to move or flex relative to the main body 26 without causing the post 42 to fracture and separate from the main body 26. Further, providing the openings 48 proximate to a base of the post 42 reduces the material required to form the first portion 18 and, thus, reduces the overall cost and weight of the first portion 18.

Figure 10:
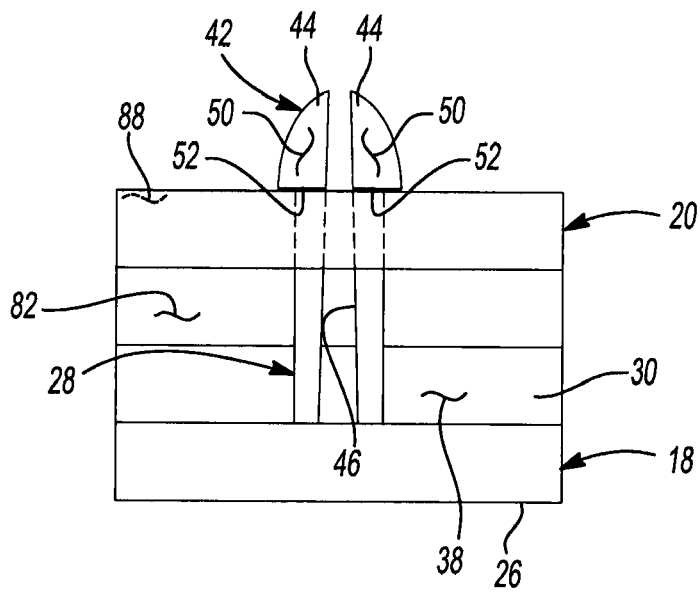
FIG. 10 is a bottom view of the tag hanger of FIG. 1 in a locked state.

Each segment of the post 42 may include a retention feature 44 at a distal end thereof. The retention features 44 may include a tapered outer surface 50 and an engagement surface 52 (FIG. 10). In one configuration, the engagement surface 52 is formed relative to each segment of the post 42 such that the engagement surface 52 is substantially parallel to and oppose the first surface 32 of the main body 26.

Figure 4:
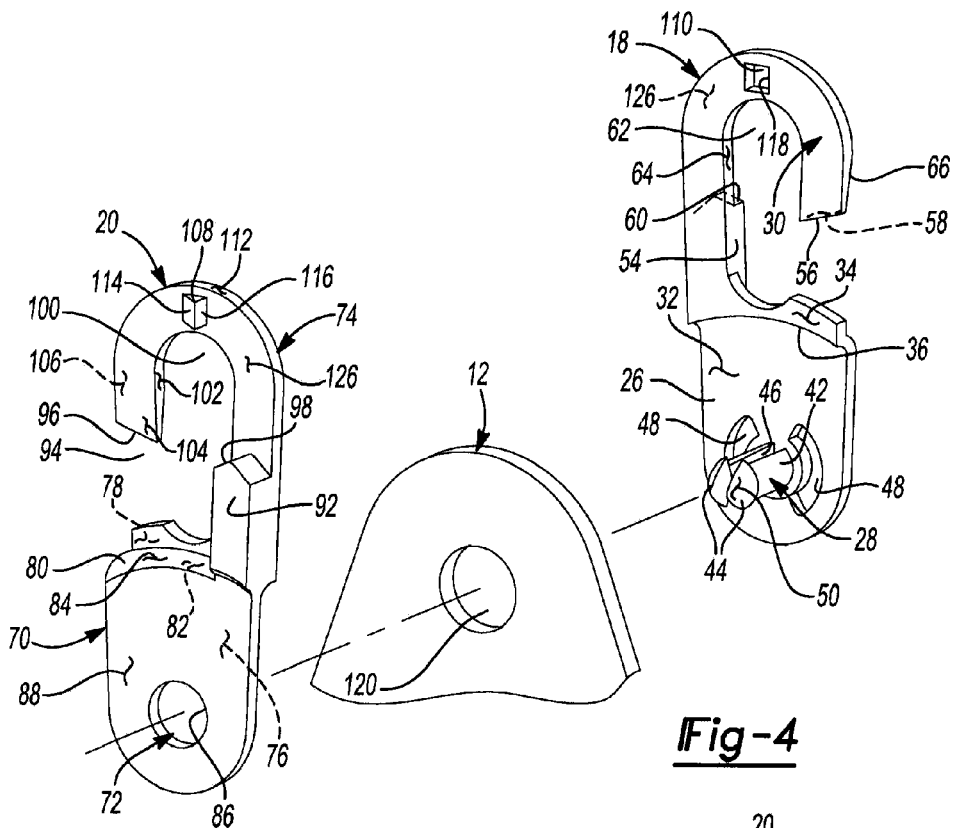
FIG. 4 is an exploded view of the tag hanger of FIG. 1 showing a portion of a tag between respective halves of the tag hanger.

The hook portion 30 may be integrally formed with the main body 26 and may extend from the main body 26 proximate to the second surface 34. The hook portion 30 may include a shoulder 54, an opening 56, and an engagement surface 58. The shoulder 54 may extend from the main body 26 proximate to the second surface 34 and may include a lock surface 60. The opening 56 may be disposed on an opposite end of the hook portion 30 than the shoulder 54 to provide access to an area 62 of the hook portion 30 bounded by an inner surface 64 (FIG. 4). The engagement surface 58 may be formed proximate to the opening 56 for interaction with the second portion 20 when the first portion 18 and the second portion 20 are coupled to one another.

The hook portion 30 may include a tapered end 66 that provides the hook portion 30 with a reduced thickness proximate to the engagement surface 58 when compared to the thickness of the remaining portion of the hook portion 30. In addition, the hook portion 30 may be formed such that an outer surface 68 of the hook portion 30 formed substantially on an opposite side of the hook portion 30 than the tapered surface 66 extends in a direction W (FIG. 7). In fact, the hook portion 30 may be formed such that the outer surface 68 extends farther in the direction W than the second surface 34 both when the hook portion 30 is disengaged from the second portion 20 and when the hook portion 30 is engaged with the second portion 20. Providing the distal end of the hook portion 34 proximate to the engagement surface 58 with the tapered surface 66 and the outer surface 68 (i.e., extending in the direction W greater than the second surface 34) facilitates movement of the first portion 18 relative to the second portion 20 when the locking mechanism 22 is moved from the unlocked state to the locked state, as will be described in greater detail below.

The second portion 20 may include a main body 70, an attachment feature 72, and a hook portion 74 extending from the main body 70. The main body 70 may include a first surface 76, a second surface 78, and a bridge portion 80 extending between and connecting the first surface 76 and the second surface 78. The bridge portion 80 may include an inner arcuate surface 82 and an outer arcuate surface 84 formed on an opposite side of the second portion 20 from the inner arcuate surface 82.

The attachment feature 72 may include an attachment aperture 86 formed through the main body 70 at the first surface 76. The attachment aperture 86 may receive the post 42 of the attachment aperture 24 of the first portion 18 to rotatably couple the first portion 18 and the second portion 20. Specifically, the tapered outer surface 50 of the retention features 44 may be received by the attachment aperture 86 when the first portion 18 is initially positioned relative to the second portion 20. A combined diameter of the retention features 44 of the post 42 may be larger than a diameter of the attachment aperture 86 when the portions of the post 42 are in the relaxed state. As such, when the tapered outer surfaces 50 of the retention features 44 initially engage the attachment aperture 86, the tapered outer surfaces 50 may contact the main body 70 of the second portion 20 proximate to the aperture 86.

Contact between the tapered outer surfaces 50 of the retention features 44 and the main body 70 proximate to the attachment aperture 86 imparts a force on the retention features 44, thereby causing the portions of the post 42 to move toward one another and into the channel 46. In other words, the post 42 is compressed, thereby reducing the effective outer diameter of the retention features 44, as the portions of the post 42 are moved toward one another and into the channel 46.

Figure 2:
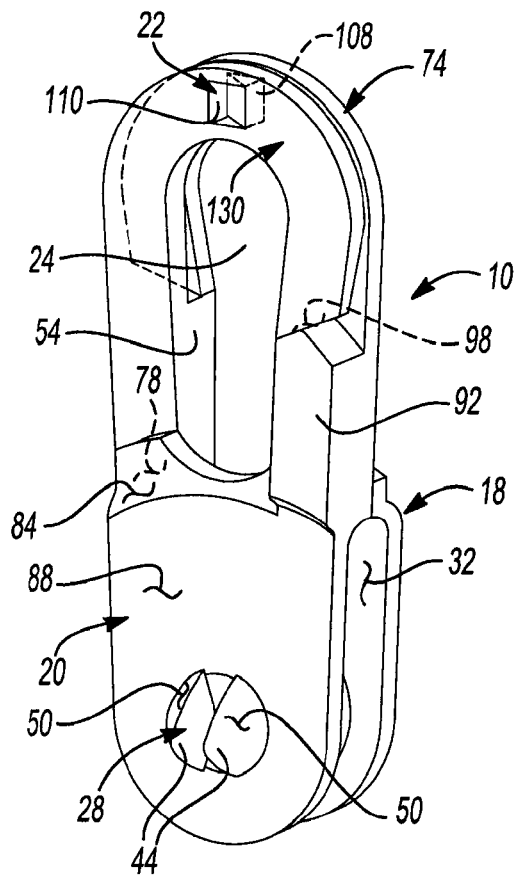
FIG. 2 is a partial perspective view of the tag hanger of FIG. 1 in a locked state.
Figure 3:
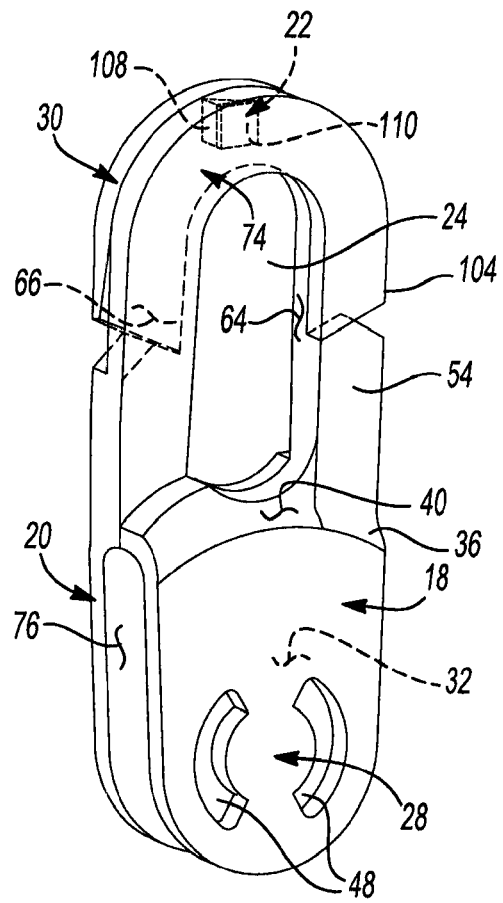
FIG. 3 is a perspective view of the tag hanger of FIG. 1 in a locked state.

Once the retention features 44 are moved sufficiently into the channel 46 and toward one another, the retention features 44 are permitted to pass through the attachment aperture 86, thereby allowing the post 42 to extend through the attachment aperture 86. Once the retention features 44 sufficiently pass through the attachment aperture 86 such that the engagement surfaces 52 of each retention feature 44 have sufficiently passed through the attachment aperture 86, the resilient nature of the material that forms the post 42 causes the portions of the post 42 to move away from one another and return the retention features 44 to a relaxed state. Because the retention features 44 include a larger combined outer diameter than a diameter of the attachment aperture 86 when in the relaxed state, the engagement surfaces 52 of each retention feature 44 are permitted to contact an outer surface 88 of the second portion 20 (FIG. 2) to prevent an inadvertent removal of the post 42 from the attachment aperture 86. In this position, the first portion 18 and the second portion 20 are rotatably attached to one another and may be rotated about a longitudinal axis 90 (FIG. 8) that extends along a longitudinal axis of the post 42.

The hook portion 74 may extend from the main body 70 proximate to the second surface 78 and may include a shoulder 92, an opening 94, and an engagement surface 96. The shoulder 92 may include a lock surface 98 that cooperates with the hook portion 30 of the first portion 18 when the locking mechanism 22 is in the locked state. The opening 94 may be formed on an opposite side of the hook portion 74 than the shoulder 92 and may provide access to an area 100 bounded by an inner surface 102 of the hook portion 74. The engagement surface 96 may be located proximate to the opening 94 and may cooperate with the lock surface 60 of the shoulder 54 when the locking mechanism 22 is in the locked state.

As with the hook portion 30 of the first portion 18, the hook portion 74 may include a tapered surface 104 and an outer surface 106 that is formed substantially on an opposite side of the hook portion 74 than the tapered surface 104. The tapered surface 104 may cause a portion of the hook portion 74 proximate to the engagement surface 96 to include a reduced thickness when compared to the thickness of the remaining portion of the hook portion 74. As with the outer surface 68 of the hook portion 30, the outer surface 106 may extend past the second surface 78 such that the outer surface 106 extends in a direction Z (FIG. 7) to a greater extent than the second surface 78.

Figure 5:
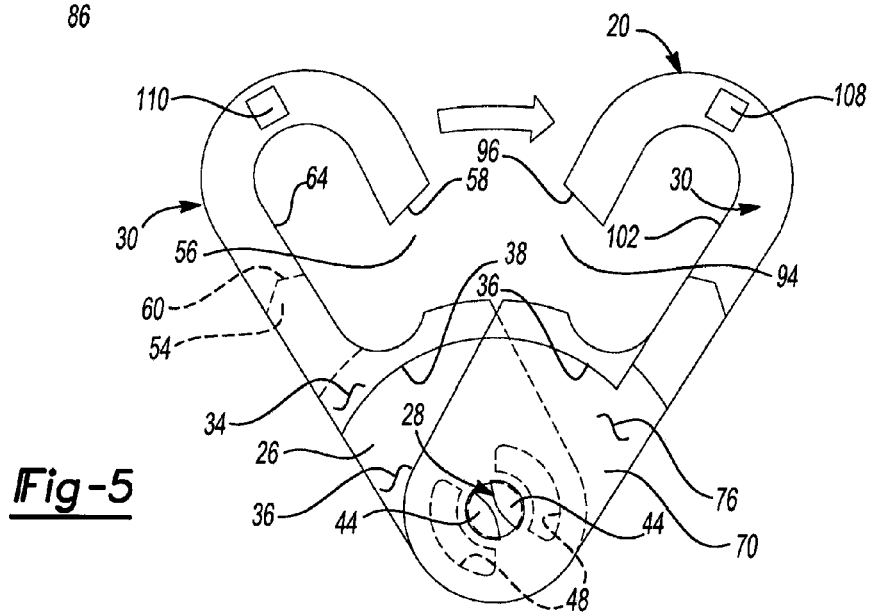
FIG. 5 is a front view of the tag hanger of FIG. 1 moving from an unlocked state to a locked state.

The locking mechanism 22 may include a projection 108 and a locking aperture 110. When the locking mechanism 22 is in the unlocked state (FIGS. 5 and 6), the projection 108 is removed from the locking aperture 110, and the first portion 18 and second portion 20 are freely rotatable relative to one another about the longitudinal axis 90. When the locking mechanism 22 is in the locked state, the projection 108 is disposed within the locking aperture 110 such that the hook portion 30 of the first portion 18 is fixed for movement with the hook portion 74 of the second portion 20, thereby restricting relative rotation between the first portion 18 and the second portion 20 about the longitudinal axis 90. As shown in FIG. 4, the projection 108 may be formed with the hook portion 74 of the second portion 20 while the locking aperture 110 may be formed with the hook portion 30 of the first portion 18. While the projection 108 will be described and shown hereinafter as being associated with the second portion 20 and the locking aperture 110 will be described and shown hereinafter as being associated with the first portion 18, the projection 108 could alternatively be associated with the first portion 18 while the locking aperture 110 could be associated with the second portion 20.

The projection 108 may be disposed proximate to a top surface 112 of the hook portion 74 and may include a tapered leading edge 114 and a trailing locking edge 116 (FIG. 4). The tapered leading edge 114 may engage the hook portion 30 when the first portion 18 is sufficiently rotated relative to the second portion 20 about the longitudinal axis 90 to facilitate insertion of the projection 108 into the locking aperture 110. Once the projection 108 is sufficiently received by the locking aperture 110, the trailing locking edge 116 may engage the locking aperture 110 to prevent inadvertent removal of the projection 108 from the locking aperture 110.

The locking aperture 110 may include a substantially square or rectangular shape and may include a locking edge 118 that is in contact with the locking edge 116 of the projection 108 when the projection 108 is disposed within the locking aperture 110. Engagement between the locking edge 116 of the projection 108 and the locking edge 118 of the locking aperture 110 fixes the hook portion 30 for movement with the hook portion 74 and, thus, restricts relative rotation between the first portion 18 and the second portion 20 about the longitudinal axis 90.

With particular reference to FIGS. 5-8, operation of the tag hanger 10 will be described in detail. The tag hanger 10 may be used to maintain a position of a tag 12 relative to a collar 14 of an animal 16, as described above. The tag 12 may include an aperture 120 (FIG. 4) that may be received by the post 42 to position and maintain the tag 12 relative to the first portion 18 and the second portion 20 when the first portion 18 is joined to the second portion 20.

The tag 12 may be initially positioned relative to the first portion 18 such that the aperture 120 opposes the post 42. The post 42 may be inserted into the aperture 120 of the tag 12 to attach the tag 12 to the first portion 18 via the post 42. In one configuration, an outer diameter of the post 42 is substantially identical to a diameter of the aperture 120 such that the tag 12 is restricted from rotating about the post 42. In another configuration, the aperture 120 of the tag 12 may include a larger diameter than the diameter of the post 42 to permit the tag 12 to rotate about the post 42. Regardless of whether or not the tag 12 is permitted to rotate about the post 42, interaction between the aperture 120 and the post 42 positions the tag 12 relative to the first portion 18 and, thus, positions the tag 12 relative to the collar 14 when the tag hanger 10 is attached to the collar 14.

After the tag 12 is attached to the first portion 18 via the post 42, the second portion 20 may be positioned relative to the first portion 18 such that the tapered outer surfaces 50 of the retention features 44 oppose the attachment aperture 86 of the second portion 20. At this point, a force may be applied to one or both of the first portion 18 and the second portion 20 in the area of the main body 26 and the main body 70 to cause the post 42 to be inserted into the attachment aperture 86. Specifically, a force may be applied to one or both of the first portion 18 and the second portion 20 at the main bodies 26, 70, along the longitudinal axis 90 to cause the engagement surfaces 50 of the retention features 44 to engage the second portion 20 about an outer perimeter of the attachment aperture 86. Because the combined outer diameter of the tapered outer surfaces 50 may be larger than the diameter of the attachment aperture 86, inserting the tapered outer surfaces 50 into the attachment aperture 86 causes the portions of the post 42 to be compressed such that the portions of the post 42 move toward one another and into the channel 46. Movement of the portions of the post 42 into the channel 46 permits the retention features 44 to pass through the attachment aperture 86.

Once the retention features 44 pass through the attachment apertures 86, the engagement surfaces 52 of the retention features 44 oppose the outer surface 88 of the second portion 20, thereby preventing inadvertent removal of the post 42 from the attachment aperture 86. Preventing removal of the post 42 from the attachment aperture 86 likewise prevents inadvertent removal of the tag 12 from the post 42 and, as a result, attaches the tag 12 to the first portion 18 and the second portion 20.

When the post 42 is initially inserted into the attachment aperture 86, the locking mechanism 22 is in the unlocked state. As such, the first portion 18 and the second portion 20 are freely rotatable relative to one another about the longitudinal axis 90. At this point, the tag 12 is attached to the first portion 18 and the second portion 20 due to interaction between the aperture 120 of the tag 12 and the post 42 of the first portion 18, but the first portion 18 and the second portion 20 are not fixed relative to one another and are freely rotatable about the longitudinal axis 90.

The tag hanger 10 and, thus, the tag 12, may be attached to the collar 14 of the animal 16 by inserting a ring 122 (FIG. 1) associated with the collar 14 into one of the hook portions 30, 74 of the first portion 18 and the second portion 20. Specifically, the ring 122 may be received by the opening 56 of the hook portion 30 or, alternatively, may be received by the opening 94 of the second hook portion 74. At this point, the ring 122 opposes one of the inner surface 64 of the hook portion 30 or the inner surface 102 of the hook portion 74.

When the first portion 18 is rotatably coupled to the second portion 20, the ring 122 may be positioned between the first portion 18 and the second portion 20 such that the ring 122 opposes the openings 56, 94 of the respective hook portions 30, 74. When the ring 122 is positioned such that the ring 122 opposes the openings 56, 94, the first portion 18 and/or second portion 20 may be rotated about the longitudinal axis 90 such that the tapered surfaces 66, 104 of the hook portions 30, 74 move closer to one another.

Upon sufficient relative rotation between the first portion 18 and the second portion 20 about the longitudinal axis 90, the second surface 34 of the main body 26 engages the second surface 78 of the main body 70 such that the first portion 18 and the second portion are in slidable contact with one another at the second surfaces 34, 78. Continued relative rotation between the first portion 18 and the second portion 20 likewise causes the tapered surface 66 of the hook portion 30 to contact the tapered surface 104 of the hook portion 74 (FIG. 7). Engagement between the tapered surface 66 and the tapered surface 104 exerts a force on the first portion 18 and exerts a force on the second portion 20 to move the hook portion 30 in the direction W and the hook portion 74 in the direction Z (FIG. 7).

Engagement between the tapered surface 66 and the tapered surface 104 also exerts a force on the first portion 18 and the second portion 20 to move the first portion 18 and the second portion 20 away from one another along the longitudinal axis 90 in an area proximate to the attachment features 28, 72. Specifically, because the first portion 18 and the second portion 20 are in slidable contact at the second surfaces 34, 78 of the respective main bodies 26, 70 and, further, because engagement between the tapered surfaces 66, 104 causes the hook portions 30, 74 to pass behind one another such that an outer surface 124 of the hook portion 30 is in contact with an outer surface 126 of the hook portion 74, a force is applied to the first portion 18 and the second portion 20 along the longitudinal axis 90 that urges the first portion 18 and the second portion 20 in opposite directions along the longitudinal axis 90. As shown in FIGS. 4 and 7, the outer surface 124 of the hook portion 30 is formed on an opposite side of the first portion 18 than the second surface 34. Likewise, the outer surface 126 of the hook portion 74 is formed on an opposite side of the second portion 20 than the second surface 78. As such, the first portion 18 and the second portion 20 are simultaneously in contact with one another on opposite sides of the first portion 18 and the second portion 20 (i.e., at the interface of the second surfaces 34, 78 and at the interface of the outer surfaces 124, 126).

Causing the first portion 18 and the second portion 20 to be simultaneously in contact at both sides of the first portion 18 and the second portion 20 exerts a force on each of the first portion 18 and the second portion 20 such that the first surface 32 is urged away from the first surface 76 along the longitudinal axis 90. Urging the first surface 32 of the main body 26 away from the first surface 76 of the main body 70 causes the outer surface 88 of the main body 70 to contact the engagement surfaces 52 of the retention features 44 (FIG. 8). In so doing, the force exerted on the first portion 18 and the second portion 20 due to engagement between the first portion 18 and the second portion 20 at both sides of the first portion 18 and the second portion 20 (i.e., at the second surfaces 34, 78 and at the outer surfaces 124, 126) defines a distance X (FIG. 8) between the first surface 32 of the main body 26 and the first surface 76 of the main body 70. Defining the distance X between the first surfaces 32, 76 of the respective main bodies 26, 70 defines a gap between the first portion 18 and the second portion 20 proximate to the attachment features 28, 72 and, therefore, defines a space in which the tag 12 may be disposed.

The distance X may be defined such that the distance X is substantially equal to a thickness of the tag 12. As such, when the tag 12 is disposed between the first portion 18 and the second portion 20 such that the aperture 120 is received by the post 42, the tag 12 may be snuggly fit between the first portion 18 and the second portion 20 to restrict rotation of the tag 12 about the post 42. Alternatively, the distance X between the first surface 32 and the first surface 76 along the longitudinal axis 90 may be greater than a thickness of the tag 12 in an area proximate to the aperture 120 to allow the tag 12 to move within the space defined between the first surface 32 of the main body 26 and the first surface 76 of the main body 70 during use.

When the tag hanger 10 is in the position shown in FIG. 6, the ring 122 is disposed generally between the hook portion 30 and the hook portion 74 such that the ring 122 is completely surrounded by the hook portion 30 and the hook portion 74. Namely, the inner surface 64 cooperates with the inner surface 102 to capture the ring 122 between the hook portions 30, 74. Continued relative rotation between the first portion 18 and the second portion 20 about the longitudinal axis 90 such that the second surface 34 slides along the second surface 78 and the outer surface 124 slides along the outer surface 126 causes the tapered leading edge 114 of the locking mechanism 22 to encounter the outer surface 124 of the hook portion 30.

Continued relative rotation between the first portion 18 and the second portion 20 causes the tapered leading edge 114 to slide along the outer surface 124 until the tapered leading edge 114 encounters the locking aperture 110 formed in the hook portion 30. At this point, the tapered leading edge 114 moves into the locking aperture 110 and the locking edge 116 engages the locking edge 118 of the locking aperture 110, thereby placing the locking mechanism 22 in the locked state. The locking mechanism 22 will remain in the locked state until a force is applied to one or both of the hook portions 30, 74 to separate the hook portions 30 to allow the projection 108 to disengage the locking aperture 110. When the locking mechanism 22 is in the locked state, relative rotation between the first portion 18 and the second portion 20 about the longitudinal axis 90 is restricted. Accordingly, the ring 122 disposed generally within the hook portions 30, 74 of the first portion 18 and the second portion 20 is prevented from being removed from the hook portions 30, 74. As such, the tag hanger 10 is attached to the ring 122 as long as the ring 122 is disposed within the hook portions 30, 74 and the locking mechanism 22 is in the locked state. The tag 12 is likewise attached to the collar 14 via the ring 122, as the tag 12 is attached to the tag hanger 10 at the post 42.

When the locking mechanism 22 is in the locked state, the hook portions 30, 74 may be positioned relative to one another such that the engagement surface 58 of the hook portion 30 is in contact with the lock surface 98 of the shoulder 92 and the engagement surface 96 of the hook portion 74 is in contact with the lock surface 60 of the shoulder 54. When the engagement surfaces 58, 96 are respectively in contact with the lock surfaces 60, 98, cooperation between the engagement surfaces 58, 96 and the lock surfaces 60, 98 further serve to aid in preventing separation of the first portion 18 and the second portion 20 at the hook portions 30, 74. Namely, any forces applied to one or both of the first portion 18 and the second portion 20 to separate the hook portions 30, 74 may be counteracted due to engagement between the engagement surfaces 58, 96 and the lock surfaces 60, 98. Further, such forces can also be counteracted due to engagement between the projection 108 and the locking aperture 110 of the locking mechanism 22. In short, the locking mechanism 22, as well as the engagement surfaces 58, 96 and lock surfaces 60, 98 cooperate to prevent inadvertent separation of the first portion 18 from the second portion 20 to ensure that the ring 122 remains disposed between the hook portions 30, 74 when the locking mechanism 22 is moved into the locked state.

When the locking mechanism 22 is moved into the locked state, the opening 56 of the hook portion 30 is closed by the hook portion 74 of the second portion 20. Likewise, the opening 94 of the hook portion 74 is closed by the hook portion 30 of the first portion 18. As such, the ring 122 is prevented from being removed from the hook portions 30, 74, as the hook portions 30, 74 close the openings 56, 94 when the locking mechanism 22 is in the locked state. Accordingly, the tag hanger 10 may support the tag 12 relative to the collar 14 when the locking mechanism 22 is in the locked state, as the ring 122 is prevented from being removed from the hook portions 30, 74.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tag hanger comprising:
   a first part having a post and a first locking element movable from an unlocked state to a locked state, said post defining an axis of rotation and including a retention feature; and
   a second part having an attachment aperture that rotatably receives said post to rotatably couple said first and second parts and a second locking element movable from an unlocked state to a locked state, said retention feature operable to restrict removal of said post from said attachment aperture and said second part cooperating with said first part to define an aperture operable to attach the tag hanger to an external structure when said first and second locking elements are in said locked state;
   wherein each of said first and second parts is integrally formed as a unitary part and said tag hanger consists solely of said first and second parts;
   wherein said first part includes a first hook portion having a first opening and said second part includes a second hook portion having a second opening, said first opening being closed by said second hook portion when said first and second locking elements are in said locked state and said second opening being closed by said first hook portion when said first and second locking elements are in said locked state;
   wherein said first locking element engages said second locking element when said first and second locking elements are in said locked state; and further
   wherein relative rotation between said first part and said second part about said post causes resilient deflection of said first hook portion relative to said second hook portion thereby enabling engagement between said first locking element and said second locking element.

2. The tag hanger of claim 1, wherein said second locking element includes a projection and said first locking element includes a locking aperture, said projection received within said locking aperture when said first and second locking elements are in said locked state.

3. The tag hanger of claim 2, wherein said projection has a tapered surface configured to engage a facing surface adjacent said locking aperture upon relative rotation between said first and second parts to cause said deflection.

4. The tag hanger of claim 3, wherein said first and second locking elements enter said locked state when said facing surface disengages from said tapered surface.

5. A tag hanger comprising:
   a first part having a post and a first locking element movable from an unlocked state to a locked state, said post defining an axis of rotation and including a retention feature; and
   a second part having an attachment aperture that rotatably receives said post to rotatably couple said first and second parts and a second locking element movable from an unlocked state to a locked state, said retention feature operable to restrict removal of said post from said attachment aperture and said second part cooperating with said first part to define an aperture operable to attach the tag hanger to an external structure when said first and second locking elements are in said locked state;
   wherein said retention feature is movable from a relaxed state to a compressed state, said retention feature movable into said compressed state to permit said retention feature to pass through said attachment aperture and movable into said relaxed state following insertion of said retention feature into said attachment aperture to allow said retention feature to restrict removal of said post from said attachment aperture.

6. The tag hanger of claim 5, wherein said post extends from a first surface of said first part and said second part includes a second surface opposing said first surface when said post is received within said attachment aperture, said first surface and said second surface cooperating to define a tag-receiving space between said first surface and said second surface.

7. The tag hanger of claim 6, wherein said second part engages said retention feature to position said second surface a predetermined distance from said first surface to provide said tag-receiving space with a predetermined dimension.

8. The tag hanger of claim 7, wherein said predetermined dimension is substantially identical to a thickness of a tag supported by said post between said first surface and said second surface.

9. The tag hanger of claim 6, wherein each of said first and second parts is integrally formed and said tag hanger consists solely of said first and second parts.

10. A tag hanger comprising:
    a first integrally formed unitary part including a first hook portion having a first opening, a first locking element movable from an unlocked state to a locked state, and a post having a retention feature;
    a second integrally formed unitary part rotatably attached to said first part and including a second hook portion having a second opening, a second locking element movable from an unlocked state to a locked state, and an attachment aperture that rotatably receives said post to rotatably couple said first and second parts, said retention feature restricting removal of said post from said attachment aperture; and
    a mounting aperture formed by said first hook portion and said second hook portion, said mounting aperture formed by said first part closing said second opening and said second part closing said first opening when said first and second locking elements are in said locked state;
    wherein relative rotation between said first part and said second part causes engagement between said first locking element and said second locking element;
    wherein said second locking element includes a projection and said first locking element includes a locking aperture;
    wherein said projection is automatically received within said locking aperture upon relative rotation of said first and second parts;
    wherein said tag hanger consists solely of said first and second parts; and further
    wherein said retention feature is movable from a relaxed state to a compressed state, said retention feature movable into said compressed state to permit said retention feature to pass through said attachment aperture and movable into said relaxed state following insertion of said retention feature into said attachment aperture to allow said retention feature to restrict removal of said post from said attachment aperture.

11. A tag hanger comprising:
- a first part including a first hook portion having a first opening, a first locking element movable from an unlocked state to a locked state, and a post having a retention feature;
- a second part rotatably attached to said first part and including a second hook portion having a second opening, a second locking element movable from an unlocked state to a locked state, and an attachment aperture that rotatably receives said post to rotatably couple said first and second parts, said retention feature restricting removal of said post from said attachment aperture; and
- a mounting aperture formed by said first hook portion and said second hook portion, said mounting aperture formed by said first part closing said second opening and said second part closing said first opening when said first and second locking elements are in said locked state;
- wherein relative rotation between said first part and said second part causes engagement between said first locking element and said second locking element;
- wherein said second locking element includes a projection and said first locking element includes a locking aperture;

wherein said projection is automatically received within said locking aperture upon relative rotation of said first and second parts;
- wherein said post extends from a first surface of said first part and said second part includes a second surface opposing said first surface when said post is received within said attachment aperture, said first surface and said second surface cooperating to define a tag-receiving space between said first surface and said second surface.

12. The tag hanger of claim 11, wherein said second part engages said retention feature to position said second surface a predetermined distance from said first surface to provide said tag-receiving space with a predetermined dimension.

13. The tag hanger of claim 12, wherein said predetermined dimension is substantially identical to a thickness of a tag supported by said post between said first surface and said second surface.

14. The tag hanger of claim 11, wherein each of said first and second parts is integrally formed as a unitary part and said tag hanger consists solely of said first and second parts.

15. A tag hanger comprising:
- an integrally formed first part comprising a first main body portion having a first surface, a post extending perpendicularly from said first surface and defining an axis of rotation, said post having a retention feature, and a first hook portion extending from said first main body portion and having a first opening; and
- an integrally formed second part comprising a second main body portion having a second surface perpendicular to said axis, an attachment aperture formed in said second surface for rotatably receiving said post to rotatably couple said first and second parts, and a second hook portion extending from said second main body portion and having a second opening;
- wherein said retention feature is operable to restrict removal of said post from said attachment aperture;
- wherein said second opening is closed by said first hook portion and said first opening is closed by said second hook portion upon relative rotation between said first part and said second part about said axis of rotation; and further
- wherein an axial distance is created between said first surface and said second surface for receiving a tag supported by said post between said first surface and said second surface.

16. The tag hanger of claim 15, wherein the tag hanger consists solely of said first and second parts.

17. The tag hanger of claim 16, wherein said first hook portion has a first locking element and said second hook portion has a second locking element, and wherein said first and second locking elements automatically engage in a locked state when the first hook portion closes said second opening and the second hook portion closes said first opening upon relative rotation between said first part and said second part.

* * * * *